United States Patent Office 3,439,696
Patented Apr. 22, 1969

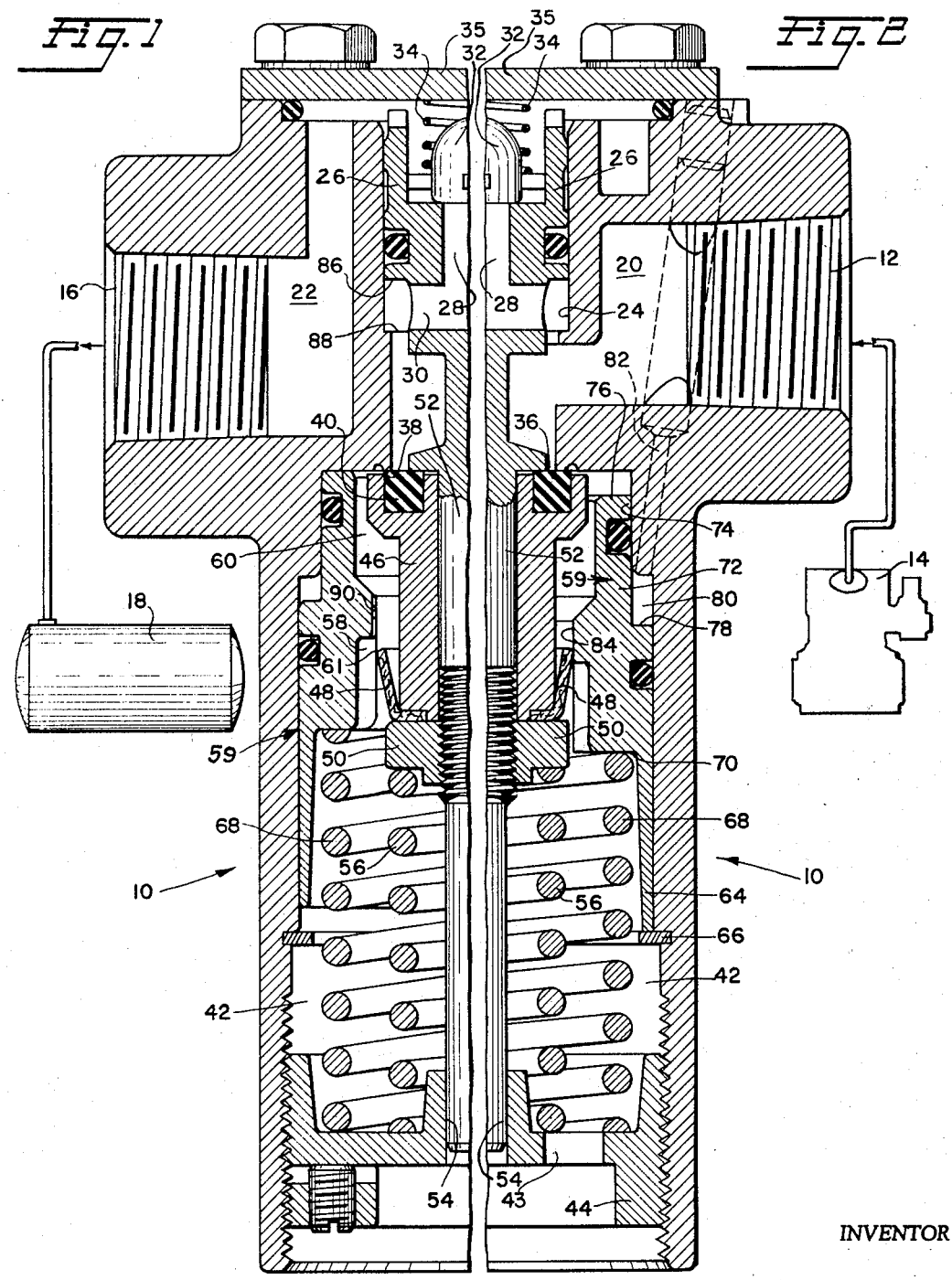

3,439,696
FLUID PRESSURE CONTROL VALVE
Harry M. Valentine, Elyria, Ohio, assignor to Bendix-Westinghouse Automotive Air Brake Company, Elyria, Ohio, a corporation of Delaware
Filed Dec. 15, 1966, Ser. No. 601,938
Int. Cl. G05d 7/00, 9/00; F16k 17/20
U.S. Cl. 137—108
4 Claims

ABSTRACT OF THE DISCLOSURE

An air compressor discharge line unloader valve including a pressure responsive device subject to compressed air delivered by the compressor for insuring snap action opening of the unloader valve.

---

This invention relates to fluid pressure responsive control valves and more particularly to a valve especially adapted for controlling the discharged pressure of an air compressor.

Air compressor discharge line unloader valves are well known and respond to predetermined system pressures to move a normally closed valve element to open position whereby the discharge of a compressor is pumped directly to atmosphere instead of to the normal receiver. When the system pressure has fallen to a pre-determined low value, less than the unloading value, the unloader valve moves automatically to closed position to again permit the delivery of pressure from the compressor to a receiver.

The principal object of the invention is to provide an improved valve that is relatively simple in construction, with fewer parts, efficient in operation, and low in cost of manufacture, and provides the combined functions of a governor, discharge line unloader, check valve, drain valve and safety valve.

Another object of the invention is to provide an unloading valve where movement to unloading position is controlled by a movable, fluid pressure responsive device which, when disposed in a first position in response to pressure, insures snap action but moves automatically to a second position while the compressor is unloaded so that when system pressure has fallen to a pre-determined low value the fluid pressure responsive element producing snap action is rendered ineffective so that the return of the unloading valve to closed position is unimpeded.

Other objects and their attendant advantages will become apparent as the following detailed description is read in conjunction with the accompanying drawings wherein:

FIG. 1 is a vertical, broken, cross-sectional view of the left hand side of a valve incorporating features of the invention; and FIG. 2 is a view of the right hand side of the valve of FIG. 1 with parts being shown in changed position.

Referring now to the drawings, the numeral 10 designates a valve body or casing having an inlet port 12 connected to the delivery side of a compressor 14 and a delivery port 16 connected to a fluid reservoir 18. Within the casing 10 are inlet and delivery cavities 20, 22 connected respectively to the inlet and delivery ports 12, 16 and between the cavities 20, 22 is a vertical bore 24 slidably receiving a piston member 26 having a central passage 28 therein connected to the inlet cavity 20 by way of branch passage 30. The upper end of the piston member 26 is recessed to slidably receive a check valve member 32 which is urged to closed position by a spring 34 interposed between the valve and an upper closure plate 35. It will be apparent that with the parts of the valve in the position of the drawing, that when the compressor is operated fluid flows through the inlet port 12, the delivery cavity 20, the passages 30, 28 past the check valve 32 into the delivery cavity 22 and thence into the receiver 18 by way of the delivery port 16.

The lower end of the inlet cavity 20 defines an exhaust port 36 surrounded by a valve seat 38 against which an exhaust valve element 40 is normally seated to cut off communication between the inlet cavity 20 and an atmospheric cavity 42 which is connected to atmosphere by a port 43 in a threaded closure member 44 at the lower end of the casing 10.

The exhaust valve 40 is carried in an annular recess at the upper end of a valve carrying member 46 which carries at its lower end a lip cup 48 clamped in position between a shoulder on the member 46 and a nut 50 received on a plunger 52 integrally joined with the piston 26 and having an extension 54 slidably received at its lower end in a guide opening 54 in the closure member 44.

The member 46 and piston 26 are normally urged to the position of the drawing by a spring 56 interposed between the upper surface of the closure member and a shoulder on the nut 50. When the parts of the valve are in the position shown on the left hand side of the drawing, the lip 61 of lip cup 48 engages flutes 58 machined on the interior of a sleeve like member 59 with the spaces between the flutes affording free fluid passage means between the atmospheric cavity 42 and an exhaust cavity 60, in the sleeve 59, above the lip 61 of the lip cup 48 whereby the cavity 60 and the atmospheric port 43 are in open communication with each other. The sleeve member 59 is slidably received in the upper end of the atmospheric cavity 42 and is provided with a skirt 64 which is adapted to engage a stop ring 66 when the member 59 is moved downwardly from its position shown in FIG. 1 to the position shown in FIG. 2.

The member 59 is urged at all times to the upper position shown on the left hand side by a spring 68 interposed between the closure member 44 and a shoulder 70 at the upper end of the skirt 64. The upper end 72 of the member 59 is of reduced diameter and is received in a complementary sized bore 74 at the stepped upper end of the cavity 42 with the upper annular edge 76 of the reduced diameter part 72 of the sleeve 59 abutting the upper wall of the cavity 42 to limit the upward movement of the member 59. Spaced below the edge 76 of the sleeve is a shoulder 78 which defines with the reduced diameter part 72 an annular pressure receiving chamber 80 which is connected to the inlet cavity 20 by way of a drilled passage 82, the arrangement being such that when system pressure rises to a predetermined level this pressure acts downwardly through the passage 82 onto the annular shoulder 78 to move the sleeve 59 downwardly against the upward force of spring 68 until the lower edge of the skirt engages stop member 66, as shown in FIG. 2, with the sleeve being retained in this position so long as the pressure is at least equal to a predetermined intermediate level, which may be on the order of 85 p.s.i. for an unloading pressure on the order of 105 p.s.i.

It will be seen from the right hand side of the valve as shown in FIG. 2 that when the sleeve 59 is in its lower position the solid annular wall 84 on the interior of the sleeve 59 above the flutes is in sealing engagement with the lip 61 of the lip cup 48; that is to say, communication between the exhaust cavity 60 above the lip cup and the atmospheric cavity 42 below the cup is cut off.

In operation, assuming the parts in the no-air position which is the position shown in FIG. 1, when the compressor 14 is started, it delivers pressure from the inlet port 12 to the receiver 18 by way of the check valve 32 and the delivery port 16 as above explained. As the pressure builds up to the predetermined intermediate pressure of 85 p.s.i., acts downwardly through the passage 82 onto the shoulder 78 to move the sleeve 59 downwardly to the position shown in FIG. 2 wherein the lip 61 of the lip cup 48 is in sealing engagement with the solid wall part 84 on the interior of the sleeve above the flutes 58. As the pressure continues to build up in the reservoir 18 it exerts an increasingly larger downward force on the piston 26 and when the pressure reaches a level established by the force of the spring 56, the piston 26 and the valve carrying member 46 are moved downwardly until the exhaust valve 40 is cracked open whereupon fluid pressure enters the exhaust cavity 60 above the lip cup and acts downwardly on the latter to move the member 46 downwardly with a snap action until the sealing edge 61 of the lip cup is moved below the wall 84 on the interior of the sleeve and into the region of the flutes 58 whereupon the exhaust cavity 60 is again in free communication with the atmospheric cavity 42 and fluid in the inlet cavity 20 flows freely to atmosphere through the passages between the flutes and out the port 43 as previously mentioned without effect on the lip cup.

As soon as the inlet cavity 20 is connected to atmosphere, the pressure therein obviously falls to very nearly atmospheric pressure and the compressor 14 unloads freely to atmosphere through ports 38, 43 in the expected manner. With the inlet cavity 20 at atmospheric pressure, the annular cavity 80 is also at atmospheric pressure so that the spring 68 returns the sleeve to the upper position shown on the left hand side of the drawing. Meanwhile, the receiver pressure is acting across the entire area of the upper side of piston 26 and this force is balanced against an equal force established in the spring 56 which positions the piston shoulder 86, on the underside of the piston, some distance short of engaging a shoulder 88 at the lower end of the bore 24 which receives the piston 26. The shoulder 88 at the bottom of the bore 24 is provided to prevent the piston assembly 26 from falling into the cavity 20 when the closure member 44 is removed from the body member 10.

As the pressure in the receiver falls to a predetermined low value of, say, 85 p.s.i., the spring 56 moves the member 46 upwardly which movement is not impeded in any way by appreciable pressure above the lip cup 48 because even in the upper valve-closed position of the drawing the lip 61 of the lip cup is below the upper ends of the flutes 58 as can be seen in FIG. 1. As soon as the valve 36 moves into sealing engagement with the seat 38, the compressors again commences to deliver pressure to the receiver 18 and the cycle is repeated.

From the foregoing description, it will be seen that the present invention provides means for assuring snap action movement of the exhaust valve to open position through the medium of the fluid pressure responsive sleeve 59 which in its down position as shown in the right hand side of the drawing effects a fluid tight seal with a lip cup for the first part of its movement whereby it is moved rapidly in a valve opening direction and thereafter, upon the release of pressure to atmospheric level, the sleeve 59 returns to its upper position as shown on the left hand side of the drawing so as not to impede in any way the return of the exhaust valve 36 to its closed position. A small bleed passage 90 which connects exhaust cavity 60 at all times with atmospheric cavity 42 is usually required to prevent unintentional buildup of pressure and consequent premature unloading of the compressor should the exhaust valve 36 develop a slight leak.

Those skilled in the art will recognize that the valve of the invention is susceptible of a variety of changes and modifications.

What is claimed is:
1. In a fluid pressure valve of the type having a body, inlet and exhaust cavities in said body, an exhaust port between said cavities, an exhaust valve in said exhaust cavity and resiliently urged to closed position against said exhaust port, and fluid pressure responsive means in said body for moving said exhaust valve to its open position, the invention which comprises fluid conduit means in said body leading from said exhaust cavity to atmosphere, means in said body responsive to pressures in said inlet cavity below and above predetermined levels for respectively connecting and disconnecting said fluid conduit means to and from said exhaust cavity, a fluid flow responsive device operatively connected to said exhaust valve, said device being so arranged that when said conduit means is disconnected from said exhaust cavity said device is operated by fluid flowing through said exhaust port upon cracking of said exhaust valve to move the latter to its open position with a snap action, and means responsive to movement of said exhaust valve a predetermined distance in an opening direction to connect said fluid conduit means with said exhaust cavity so that fluid flows freely from said inlet cavity through said conduit means to atmosphere without effect on said fluid flow responsive device.

2. In the valve of claim 1 wherein the means responsive to pressures in said inlet cavity comprises an annular sleeve slidably received in said body and including a pressure receiving part exposed at all times to the pressure in said inlet cavity, said fluid conduit means being carried by said sleeve for movement into and out of communication with said exhaust cavity depending upon whether the pressure in said inlet cavity is below or above said predetermined levels.

3. In the valve of claim 2 wherein said exhaust cavity is disposed within said sleeve, and said exhaust port, exhaust valve and fluid flow responsive device are arranged co-axially within said sleeve, said fluid conduit means being open to atmosphere at one end below said exhaust cavity and opening inwardly into said cavity at the upper end, said flow responsive device comprising a lip cup connected to said exhaust valve, the upper ends of said conduit means and the lip of said lip cup being moved above or below each other by the movement of said sleeve and said exhaust valve to connect and disconnect said exhaust cavity to and from said conduit means, and resilient means acting on said sleeve to urge it at all times to a position wherein the upper end of said conduit means is above the lip of said lip cup.

4. In a valve of claim 1 including a delivery cavity in said valve body, a one-way check valve permitting fluid flow between said inlet and delivery cavities but not in the reverse direction, and means responsive to fluid pressure in said delivery cavity for moving said exhaust valve to and retaining said valve in open position whenever the pressure in said delivery cavity is above a predetermined level.

References Cited
UNITED STATES PATENTS

| 2,647,530 | 8/1953 | Jaquith | 137—108 |
| 2,829,665 | 4/1958 | Badenoch et al. | 137—108 |
| 2,989,066 | 6/1961 | Norlin | 137—108 |
| 3,246,664 | 4/1966 | Mercier | 137—108 |
| 3,375,844 | 4/1968 | Mercier et al. | 137—108 |

JOHN PETRAKES, Primary Examiner.

U.S. Cl. X.R.
137—469, 476, 538